(12) United States Patent
Robillard, II (10) Patent No.: US 6,779,325 B1
(45) Date of Patent: Aug. 24, 2004

(54) EDGING AND TRIMMING ASSEMBLY FOR LAWN MOWER

(76) Inventor: James F. Robillard, II, 1481 Oak Grove Church Rd., Musella, GA (US) 31066

( * ) Notice: Subject to any disclaimer, the term of this patent is extended or adjusted under 35 U.S.C. 154(b) by 0 days.

(21) Appl. No.: 10/441,719

(22) Filed: May 20, 2003

(51) Int. Cl.⁷ ............................................. A01D 34/00
(52) U.S. Cl. ...................................................... 56/12.7
(58) Field of Search ................................. 56/12.7, 13.6, 56/13.7, 13.8, 13.9, 16.9, 10.7, 11.8, DIG. 4

(56) References Cited

U.S. PATENT DOCUMENTS

| | | | |
|---|---|---|---|
| 2,707,858 A | * | 5/1955 | Norton et al. .............. 56/11.5 |
| 3,319,406 A | * | 5/1967 | Miles .......................... 56/13.7 |
| 3,604,208 A | * | 9/1971 | Borunda ...................... 56/11.5 |
| 3,977,078 A | * | 8/1976 | Pittinger, Jr. ................. 30/276 |
| 4,152,882 A | * | 5/1979 | Howard ....................... 56/13.7 |
| 4,170,099 A | | 10/1979 | Owens |
| 4,226,021 A | * | 10/1980 | Hoff ............................ 30/276 |
| 4,242,855 A | * | 1/1981 | Beaver, Jr. ................... 56/13.7 |
| 4,453,372 A | * | 6/1984 | Remer ......................... 56/13.7 |
| 4,642,976 A | * | 2/1987 | Owens ........................ 56/16.9 |
| 5,035,107 A | | 7/1991 | Scarborough |
| 5,040,360 A | * | 8/1991 | Meehleder ................... 56/11.6 |
| 5,065,566 A | | 11/1991 | Gates |
| 5,159,803 A | | 11/1992 | Earley, Jr. |
| 5,167,108 A | | 12/1992 | Bird |
| 5,174,100 A | | 12/1992 | Wassenberg |
| 5,560,189 A | | 10/1996 | Devillier et al. |
| 5,598,689 A | | 2/1997 | Bork |
| 6,094,896 A | * | 8/2000 | Lane ........................... 56/13.7 |
| 6,343,461 B1 | | 2/2002 | Knott |
| 6,397,572 B1 | | 6/2002 | Roundy et al. |
| 6,415,586 B1 | | 7/2002 | Park |

* cited by examiner

*Primary Examiner*—Thomas B. Will
*Assistant Examiner*—Alicia Torres
(74) *Attorney, Agent, or Firm*—Dale J. Ream (57) ABSTRACT

An edging and trimming assembly for use with a lawn mower includes a flexible shaft extending through a hollow arm with the arm being connected to a mower deck through a hub for pivotal movement of the arm. A gear train is connected to the lawn mower's power driven rod and is selectably coupled to one end of the flexible shaft for selectable rotation thereof. A trimmer head is attached to an opposed end of the flexible shaft and includes a cutter for cutting grass upon rotation of the trimmer head. A linkage extends between the arm and the trimmer head for adjusting the trimmer head between horizontal and vertical cutting planes. The linkage enables the trimmer head to move between selectable angular configurations. A shield member is rotatably coupled to the flexible shaft for surrounding the trimmer head and defines an opening through which the cutting member extends.

16 Claims, 6 Drawing Sheets

EDGING AND TRIMMING ASSEMBLY FOR LAWN MOWER

BACKGROUND OF THE INVENTION

This invention relates generally to lawn mowing equipment and, more particularly, to an edging and trimming assembly for attachment to a riding lawnmower and which is adjustable for conventional weed trimming or for edging a sidewalk or driveway.

Lawns are typically manicured by first trimming grass around trees or fences with a weed trimmer and then riding or pushing a lawn mower to cut the remainder of grass. Conventional lawn mowers have limited maneuverability such that use of a separate trimming apparatus to cut all of the grass or weeds close to obstacles often cannot be avoided.

Various devices have been proposed for combining a trimming apparatus with a lawnmower deck. Although assumably effective for their intended purposes, the existing devices do not provide a variable speed trimming apparatus that is selectively activated or adjustable for use in either a horizontal trimming plane or a vertical edging plane.

Therefore, it is desirable to have an edging and trimming assembly that may be coupled to a lawnmower drive mechanism. Further, it is desirable to have an edging and trimming assembly that is selectably activated with selectable speed variations. Additionally, it is desirable to have an apparatus that is movable between edging and trimming configurations.

SUMMARY OF THE INVENTION

Accordingly, the present invention includes an edging and trimming assembly for use with a riding lawn mower of a type having front and rear wheels with a central mower deck situated between the front and rear wheels, the mower having a cutting blade coupled to a power driven rod defining a generally vertical axis. The edging and trimming assembly includes an elongate hollow arm with a flexible shaft extending through the arm. The arm is coupled at one end to a hub on the mower deck and positioned such that the arm is pivotally movable about the vertical axis of the power driven rod. A gear train is connected to the power driven rod and positioned in the hub adjacent the flexible shaft. A clutch assembly is connected to the gear train for engaging the gear train with the flexible shaft for rotation thereof. A trimmer head is attached to the flexible shaft and includes a cutting member for rotation by the shaft.

A linkage interconnects the arm and the trimmer head for providing multiple configuration options of the trimmer head. The linkage enables the trimmer head to move between a configuration defining a horizontal cutting plane and a configuration defining a vertical cutting plane. The linkage also includes a pair of adjustment arms movable in a scissors-like manner for adjusting an angular relation of the trimmer head. A shield defining an opening through which the cutting member may extend is rotatably positioned such that the trimmer head can operate as an edging apparatus in its vertical configuration and a trimming apparatus in its horizontal configuration.

Therefore, a general object of this invention is to provide an edging and trimming assembly coupled to the mower deck of a riding lawn mower.

Another object of this invention is to providing an assembly, as aforesaid, that is coupled to the power driven rod of the lawn mower and includes a gear train that is selectively engaged by a user.

Still another object of this invention is to provide an assembly, as aforesaid, having a trimmer head with a linkage that enables the trimmer head to be moved between a configuration defining a horizontal cutting plane for trimming and a configuration defining a vertical cutting plane for edging.

Yet another object of this invention is to provide an assembly, as aforesaid, which pivots forward of the mower deck when it encounters an obstacle.

A further object of this invention is to provide an assembly, as aforesaid, having a flexible shaft for rotation within a curved arm casing.

A still further object of this invention is to provide an assembly, as aforesaid, in which said flexible shaft includes user selected variable speed control.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 2b is an enlarged fragmentary view of the assembly as in FIG. 2a.

FIG. 4a is a sectional view taken along line 4a—4a of FIG. 3a.

FIG. 4b is an enlarged fragmentary view of the assembly as in FIG. 4a.

DESCRIPTION OF THE PREFERRED EMBODIMENT

Figure 1:
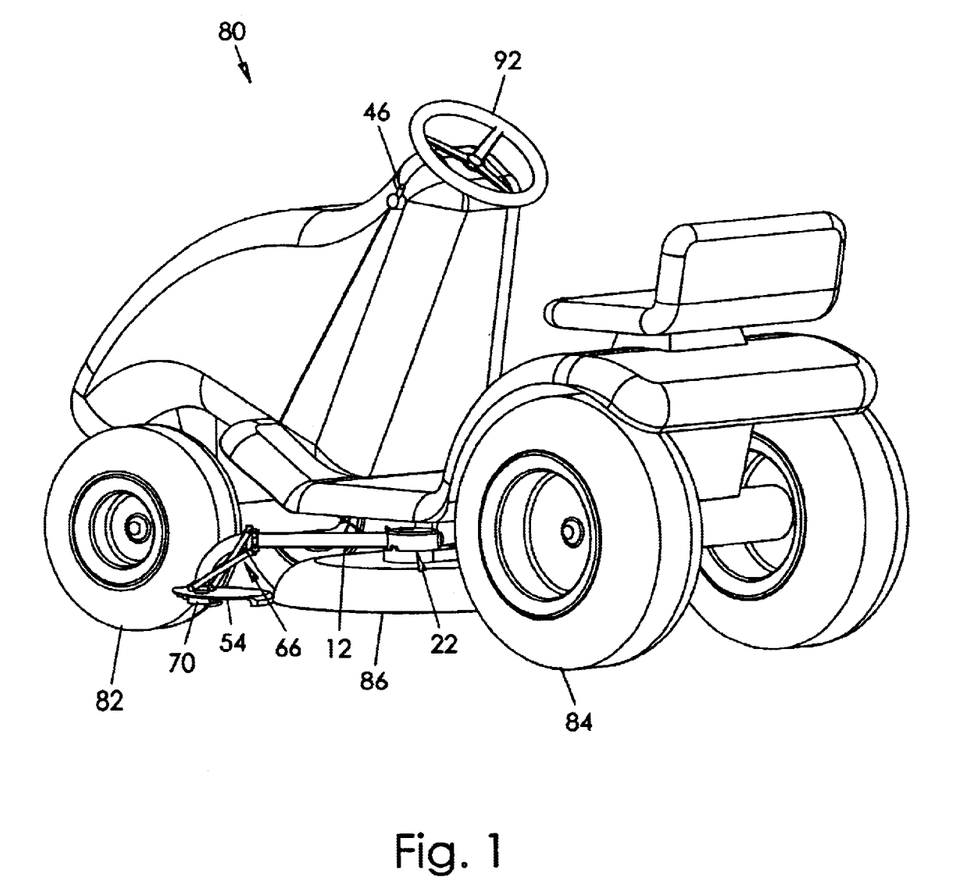
FIG. 1 is a perspective view of an edging and trimming assembly according to a preferred embodiment of the present invention in use on a riding lawn mower.
Figure 2A:
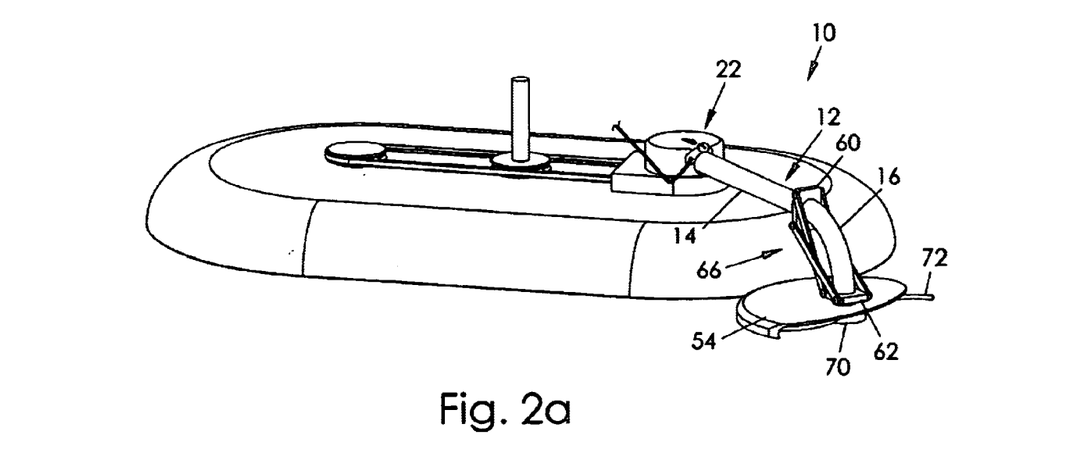
FIG. 2a is a perspective view of the assembly as in FIG. 1 with the assembly and mower deck removed from the lawn mower.
Figure 2B:
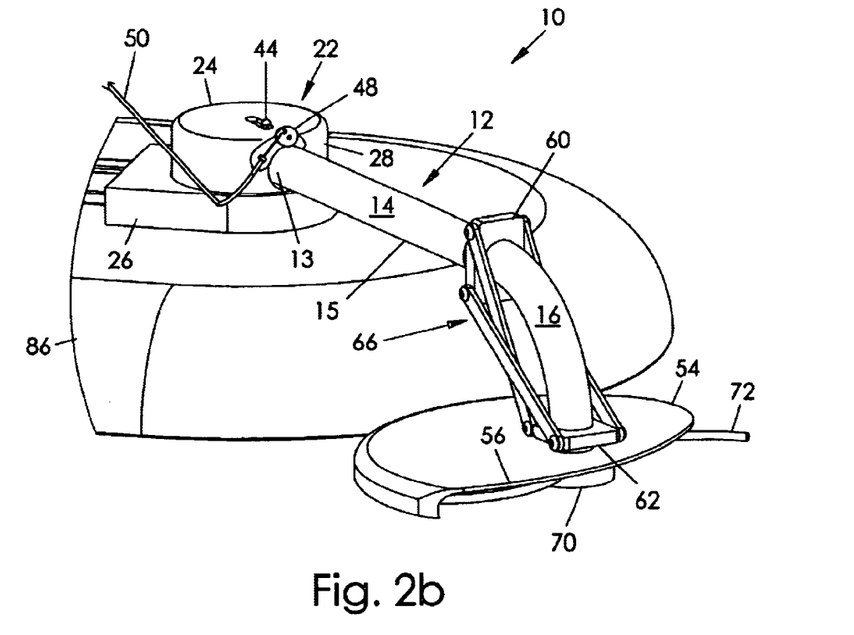
Figure 3A:
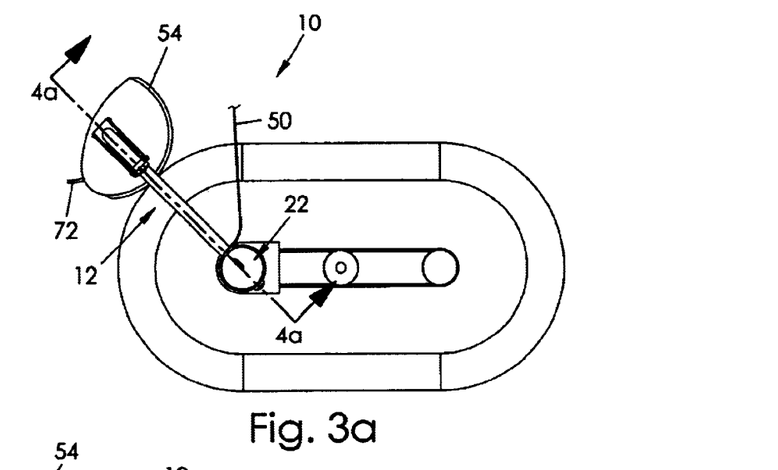
FIG. 3a is a top view of the assembly as in FIG. 2a with the arm in a normal use configuration.
Figure 3B:
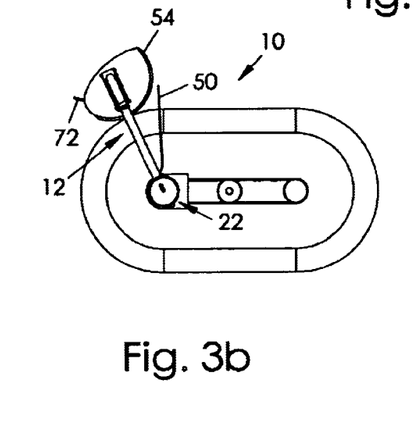
FIG. 3b is a top view of the assembly as in FIG. 2a with the arm moved to a forward configuration.

An edging and trimming assembly 10 for use with a riding lawn mower 80 will now be described in detail with reference to FIGS. 1 through 6 of the accompanying drawings. The edging and trimming assembly 10 is suitable for use with a riding lawn mower 80 of a type having a pair of front wheels 82 and a pair of rear wheels 84 with a central mower deck 86 situated between the pairs of wheels (FIG. 1). Further, the riding lawn mower 80 with which the present invention is useful is a type having cutting blade 88 coupled to the mower's power driven rod 90 that defines a generally vertical axis, the power driven rod 90 being rotated by belts and pulleys although some mowers utilize chains, shafts, or hydraulics to drive the power driven rod 90 (FIG. 4b).

Figure 4A:
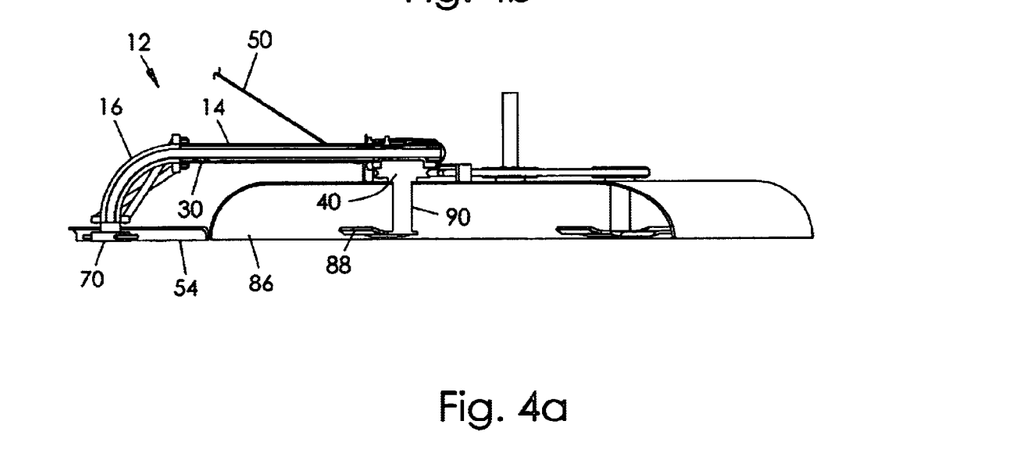
Figure 4B:
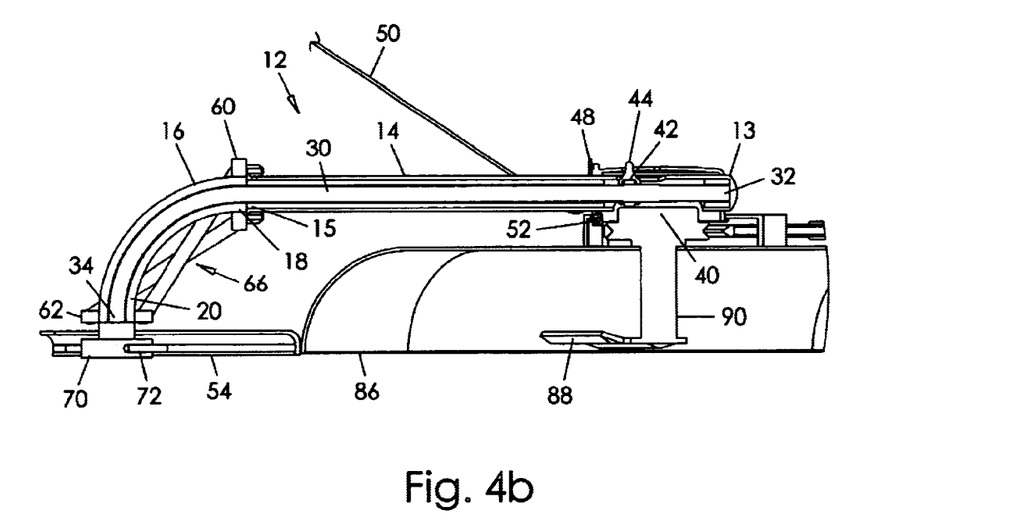
Figure 5:
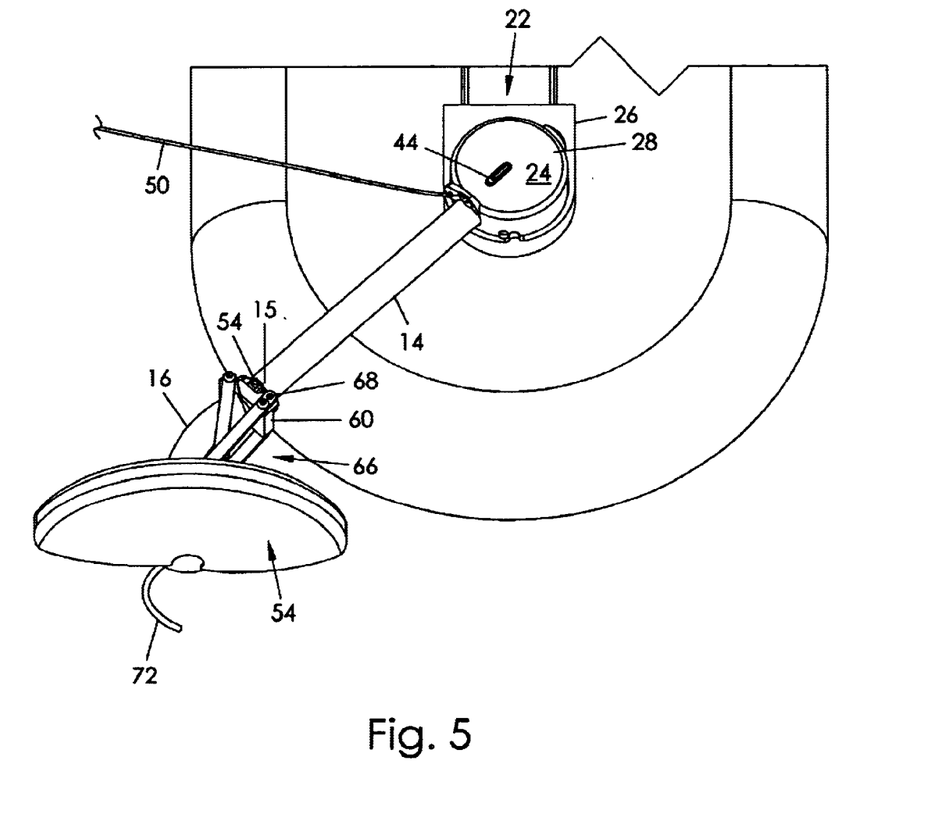
FIG. 5 is a fragmentary perspective view of the assembly as in FIG. 3c taken from another angle.

The edging and trimming assembly 10 includes an elongate hollow arm 12 having a rigid casing 14 fixedly connected to a flexible casing 16. The rigid casing 14 includes a linear configuration while the flexible casing 16 includes a curved or generally arcuate configuration. The assembly 10 further includes a hub 22 mounted to the mower deck 86 and positioned to surround one end of the power driven rod 90 (FIG. 2b). The hub 22 includes a top wall 24 for covering the end of the power driven rod 90. Further, the hub 22 includes a first/lower portion 26 fixedly attached to the mower deck 86 and a second/upper portion 28 pivotally coupled to the first/lower portion 26 (FIG. 2b). A first end 13 of the rigid casing 14 extends through an aperture in the second portion 28 of the hub 22 with a second end 15 of the rigid casing 14 being connected to the flexible casing 16 (FIGS. 4b and 5).

Figure 6:
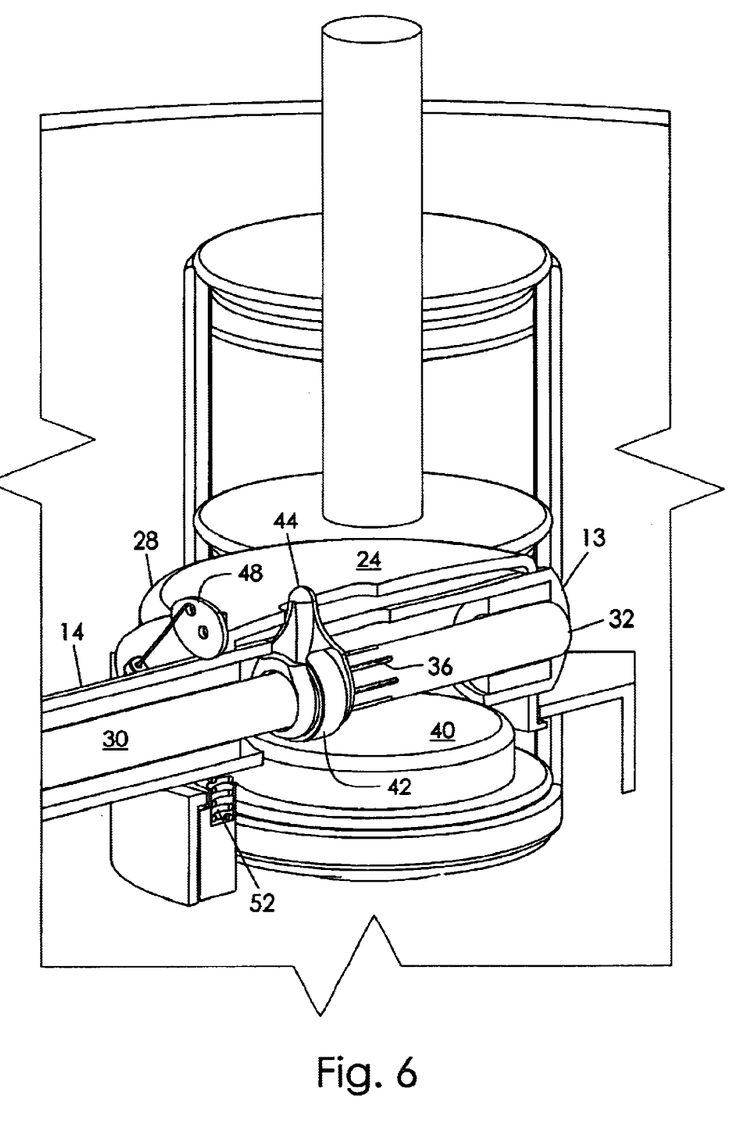
FIG. 6 is a fragmentary perspective view of the assembly with a hub broken away to show a gear train.

A flexible shaft 30 extends through both the rigid 14 and flexible 16 casings. A first end 32 of the flexible shaft 30 extends into an interior space of the hub 22 (FIG. 6). A gear train is positioned within the interior space of the hub 22 for selective engagement with the flexible shaft 30. More particularly, the gear train includes a first friction disc 40 mounted atop the power driven rod 90 of the lawn mower for rotation in a horizontal plane upon rotation of the power driven rod 90. The first friction disc 40 is positioned directly underneath a first end 32 of the flexible shaft 30 (FIG. 6). A second friction disc 42 includes a cylindrical configuration and is mounted adjacent the first end 32 of the flexible shaft 30 such that the flexible shaft 30 extends through the second friction disc 42. In a normal configuration, the first and second fiction discs are slightly displaced from one another but may be moved into engagement with one another as described more fully below. When engaged, a 90 degree transfer of rotational velocity results and the flexible shaft 30 is rotated by operation of the power driven rod 90. While friction discs are preferred, the 90 degree transfer of rotational velocity may also be accomplished using bevel or worm gears.

The second friction disc 42 is slidably movable longitudinally along an extent of the flexible shaft 30 according to complementary tongue and groove 36 structures (FIG. 6). A speed selector fork 44 is attached to an upper portion of the second friction disc 42 and extends upwardly therefrom and through the top wall 24 of the hub 22 such that a user may move the second friction disc 42 to a desired configuration (FIG. 6). The rotational velocity of the flexible shaft 30 is increased as the point of contact between the first 40 and second 42 friction discs is displaced from the vertical axis defined by the power driven rod 90. In other words, the rotational velocity imparted from the first friction disc 40 is greater at a peripheral edge thereof than at the radial focal point thereof. Therefore, a user may selectably control the speed at which the flexible shaft 30 is rotated, i.e. a user may change the gear ratio. Speed control is important in that it allows a user to match the cutting speed of a trimmer head with the thickness of the vegetation, as to be described more fully later.

A cam assembly enables a user to selectively engage the elements of the gear train so as to transfer rotational velocity from the power driven rod 90 to the flexible shaft 30. More particularly, the cam assembly includes a clutch lever 46 mounted on the lawn mower 80 at a position convenient for user manipulation, such as near the steering wheel 92 (FIG. 1). The cam assembly further includes a clutch cam 48 mounted to the upper portion 28 of the hub 22 and coupled to the rigid casing 14 of the arm 12 (FIGS. 4b and 6). A clutch cable 50 interconnects the clutch lever 46 and clutch cam 48. An operation of the clutch lever 46 causes the clutch cam 48 to depress the arm so as to engage the second friction disc 42 with the first friction disc 40. The cam assembly includes a spring 52 mounted below the arm 12 that returns the upper hub portion 28 to its normal configuration when the clutch lever 46 is disengaged.

A first end 18 of the flexible casing 16 of the arm 12 is connected to the second end 15 of the rigid casing 14, the flexible casing also having an opposed second end 20. A trimmer head 70 is attached to a second end 34 of the flexible shaft 30 (FIG. 4b) and is rotated thereby. A cutting member 72 is attached to the trimmer head 70 for trimming or edging as the trimmer head 70 rotates. A shield member 54 is rotatably mounted to a second end 20 of the flexible casing 16 and includes a generally disc-shaped configuration that substantially surrounds the trimmer head 70 and cutting member 72. The shield member 54 defines an opening 56 along one side and a portion of a bottom wall such that the cutting member 72 may contact and cut vegetation. The shield member 54 is rotatable about the axis of the flexible casing 16 such that the opening 56 may be oriented as desired and depending on the horizontal or vertical orientation of the trimmer head cutting plane, as to be described in greater detail below.

Figure 3C:
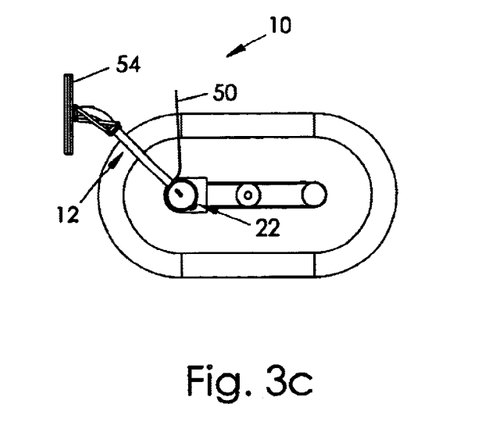
FIG. 3c is a top view of the assembly as in FIG. 2a with the trimmer head moved to a generally vertical configuration.

A linkage extends between first 18 and second 20 ends of the flexible casing 16 for selectively moving the trimmer head 70 between a configuration defining a horizontal cutting plane (FIG. 2b) and a configuration defining a vertical cutting plane (FIGS. 3c and 5). More particularly, the linkage includes a first bracket 60 pivotally coupled to the first end 18 of the flexible casing 16 for rotation about the axis of the flexible casing 16. The linkage includes a second bracket 62 fixedly attached to the second end 20 of the flexible casing 16. An arm assembly interconnects the first 60 and second 62 brackets. Therefore, the trimmer head 70 is moved between horizontal and vertical configurations upon a 90 degree rotation of the first bracket 60. A shaft pin 64 in the first bracket 60 allows a user to release or lock the first bracket 60 (FIG. 5). The flexible casing 16 allows this rotation.

Further, the arm assembly includes two pairs of adjustment arms although a single pair of adjustment arms would also work. First ends of each pair of adjustment arms 66 are pivotally coupled to the first bracket 60 and second ends of each pair of adjustment arms 66 are pivotally coupled to the second bracket in a scissors-like configuration. Thus, each pair of adjustment arms 66 defines four pivot axes such that the angular relationship between the first 60 and second 62 brackets may be selectively modified. A linkage pin 68 adjacent a pivot point of one of the adjustment arms allows a user to lock the adjustment arms 66 in place or to release them for pivotal movement. The flexible casing 16 flexes to allow this change in angle. In practice, the user may need to modify the angle between the brackets once the trimmer head 70 has first been rotated from the horizontal configuration to the vertical configuration such that the trimmer head 70 and cutting member 72 are inline with the mower deck 86 (FIGS. 3c and 5).

Further, a top wall of the shield member 54 presents a convex configuration at the opening 56 so that the arm 12 is urged toward the mower deck 86 when the shield member 54 encounters an obstacle while in use, e.g. a tree, fence post, or the like. Upon encountering such an obstacle, the shield member 54 and entire arm 12 is urged inwardly and to the front of the mower deck 86 (FIG. 3b).

The edging and trimming assembly 10 includes several control and safety mechanisms. As described above, the clutch lever 46 is provided to give a user control over engagement and disengagement of assembly operation. Therefore, the assembly 10 may be disengaged when not mowing near any obstacles to trim around. A seat interlock (not shown) may also be provided to automatically disengage the power driven rod 90 and the assembly 10 when a user is not seated on the mower.

It should be appreciated that the present assembly may be adapted to replace the trimmer head 70 with a leaf and debris blower (not shown). Further, the assembly 10 may include a handle having a battery and electric motor so as to be used as a handheld trimmer.

In use, the arm 12 and trimmer head 70 normally extend generally to one side of the mower deck 86 of the riding lawn mower 80 to which the assembly 10 is mounted (FIG. 1). However, the arm 12 is pivotally coupled to the mower deck 86 such that it is movable if an obstacle is contacted. A user may activate the trimmer head 70 by manipulating the clutch lever 46 (FIG. 1). This action engages the gear train with the flexible shaft 30 so as to impart rotational velocity of the mower's power driven shaft 30 to the flexible shaft 30 of the assembly 10 (FIG. 6). A user may also manipulate the speed selector fork 44 to adjust the speed at which the flexible shaft 30 rotates the trimmer head 70. Further, the linkage may be rotated 90 degrees so as to move the trimmer head 70 from a horizontal cutting plane to a vertical cutting plane (FIGS. 2b and 5). The adjustment arms 66 of the linkage may be pivoted so as to orient the trimmer head to be inline with the mower deck for edging (FIG. 3c). A shield member 54 surrounds the trimmer head 70 and may be rotatably positioned such that the cutting member 72 may extend into a desired cutting area.

Accordingly, the edging and trimming assembly described herein saves time and effort when cutting and trimming a lawn through the unique combination of a lawn mower mounted assembly having a flexible shaft, friction disc drive train, rotating arm, obstacle shield, trimming and edging configuration, and selective control system.

It is understood that while certain forms of this invention have been illustrated and described, it is not limited thereto except insofar as such limitations are included in the following claims and allowable functional equivalents thereof.

What is claimed is:

1. An edging and trimming assembly for use with a riding lawn mower of a type having front and rear wheels with a central mower deck situated between said front and rear wheels and having a cutting blade coupled to a power driven rod defining a generally vertical axis, said edging and trimming assembly comprising:

an elongate hollow arm;

a flexible shaft extending through said arm and having oppositely disposed first and second ends;

a hub pivotally coupling said arm to said mower deck such that said arm is pivotally movable about said vertical axis;

a gear train operatively connected to said power driven rod and positioned in said hub adjacent said first end of said flexible shaft;

means for selectively engaging said gear train with said flexible shaft adjacent said first end thereof for imparting rotational velocity from said power driven rod to said flexible shaft;

means coupled to said gear train for selectively increasing or decreasing said rotational velocity of said flexible shaft when said gear train is engaged with said flexible shaft;

a trimmer head mounted to said second end of said flexible shaft, said trimmer head having a cutting member connected thereto for cutting a path along a cutting plane;

wherein said hub includes a first portion attached to said mowing deck at a position covering said power driven rod and a second portion pivotally coupled to said first portion, said arm being connected to said second portion of said hub such that said arm is pivotally movable about said vertical axis defined by said power driven rod; and wherein said arm includes a rigid casing connected to a flexible casing with said flexible shaft extending through said rigid and flexible casing, one end of said rigid casing being attached to said hub.

2. The edging and trimming assembly as in claim 1 wherein said gear train comprises:

a first friction disc mounted atop said power driven rod and defining a generally horizontal plane, said first friction disc being axially rotated by said power driven rod about said vertical axis;

a second friction disc having a cylindrical configuration mounted for rotation about said flexible shaft, said flexible shaft extending through said second friction disc such that a rotation of said second friction disc causes a rotation of said flexible shaft; and wherein said means for selectively engaging said gear train with said flexible shaft causes said first friction disc to contact said second friction disc, whereby to impart said rotational velocity from said power driven rod to said flexible shaft.

3. The edging and trimming assembly as in claim 2 wherein said means for selectively engaging said gear train with said flexible shaft comprises:

a clutch lever;

a clutch cam mounted to said hub and coupled to said arm for relative up and down movement of said arm; and a clutch cable interconnecting said clutch lever and said clutch cam for selectively depressing said arm so as to engage said first and second friction discs with one another upon an operation of said clutch lever.

4. The edging and trimming assembly as in claim 2 wherein said means for selectively increasing or decreasing said rotational velocity of said flexible shaft includes a speed selection fork coupled to said second friction disc for selectively positioning said second friction disc longitudinally along said flexible shaft, whereby said rotational velocity of said flexible shaft increases as a contact point between said fist and said second friction discs is increasingly displaced from said vertical axis defined by said power driven rod.

5. The edging and trimming assembly as in claim 1 further comprising a linkage connected to said flexible casing of said arm for selectively moving said trimmer head between a configuration defining a horizontal cutting plane and a configuration defining a vertical cutting plane, said linkage including:

a first bracket pivotally coupled to a first end of said flexible casing and a second bracket fixedly attached to a second end of said flexible casing; and an arm assembly interconnecting said first and second brackets, whereby said trimmer head is movable between said horizontal and vertical cutting plane configurations upon a 90 degree rotation of said first bracket about said flexible casing.

6. The edging and trimming assembly as in claim 5 wherein:
   said arm assembly includes a pair of adjustment arms having respective first ends pivotally coupled to said first bracket and having respective second ends pivotally coupled to said second bracket for extension between said first and second brackets in a scissor-like configuration, whereby to regulate an angular relationship between said first and second brackets; and
   said arm assembly includes means for releasably securing said adjustment arms at a selected configuration.

7. The edging and trimming assembly as in claim 6 further comprising a shield member rotatably mounted to said second end of said flexible casing and having a generally disc-shaped configuration substantially enclosing said trimmer head, said shield member defining an opening through which said cutting member of said trimmer head may extend into a respective cutting plane, whereby said shield member is rotatable such that said opening is selectively oriented relative to said respective cutting plane.

8. The edging and trimming assembly as in claim 7 wherein said opening defines a generally convex configuration such that said arm is urged toward said mower deck when said shield member impacts an obstacle at said opening.

9. An edging and trimming assembly for use with a riding lawn mower of a type having front and rear wheels with a central mower deck situated between said front and rear wheels and having a cutting blade coupled to a power driven rod defining a generally vertical axis, said edging and trimming assembly comprising:
   an elongate hollow arm including a rigid casing connected to a flexible casing;
   a flexible shaft extending through said rigid and flexible casings, said flexible shaft having oppositely disposed first and second ends;
   a hub pivotally coupling said rigid casing of said arm to said mower deck such that said arm is pivotally movable about said vertical axis;
   means for selectively coupling said flexible shaft to said power driven rod for imparting a rotational force to said flexible shaft upon rotation of said rod;
   a trimmer head mounted to said second end of said flexible shaft, said trimmer head being rotated upon a rotation of said flexible shaft, said trimmer head having a cutting member connected thereto for cutting a path along a cutting plane;
   a linkage connected to said flexible casing for selectively moving said trimmer head between a configuration defining a horizontal cutting plane and a configuration defining a vertical cutting plane;
   wherein said linkage comprises:
      a first bracket pivotally coupled to said first end of said flexible casing and a second bracket fixedly attached to said second end of said flexible casing; and
      an arm assembly interconnecting said first and second brackets, whereby said trimmer head is movable between said horizontal and vertical cutting plane configurations upon a 90 degree rotation of said first bracket about said flexible shaft.

10. The edging and trimming assembly as in claim 9 wherein:
   said arm assembly includes a pair of adjustment arms having respective first ends pivotally coupled to said first bracket and having respective second ends pivotally coupled to said second bracket for extension between said first and second brackets in a scissors-like configuration, said pair of adjustment arms being capable of adjusting an angular relationship between said first and second brackets;
   said arm assembly includes means for releasably securing said adjustment arms at a desired configuration.

11. The edging and trimming assembly as in claim 9 further comprising means in said first bracket for releasably maintaining said trimmer head in said horizontal or vertical configuration.

12. The edging and trimming assembly as in claim 11 wherein said gear train comprises:
   a first friction disc mounted atop said power driven rod and defining a generally horizontal plane, said first friction disc being axially rotated by said power driven rod about said vertical axis;
   a second friction disc having a cylindrical configuration and mounted for rotation about said flexible shaft, said flexible shaft extending through said second friction disc such that a rotation of said second friction disc causes a rotation of said flexible shaft;
   wherein said second friction disc is slidably mounted to said flexible shaft for selective longitudinal movement therealong; and
   wherein said means for selectively engaging said gear train with said flexible shaft causes said first friction disc to contact said second friction disc, whereby to impart said rotational velocity from said power driven rod to said flexible shaft.

13. The edging and trimming assembly as in claim 11 wherein said means for selectively engaging said gear train with said flexible shaft comprises:
   a clutch lever;
   a clutch cam mounted to said hub and coupled to said arm for relative up and down movement of said arm; and
   a clutch cable interconnecting said clutch lever and said clutch cam for selectively depressing said arm so as to engage said first and second friction discs with one another upon an operation of said clutch lever.

14. The edging and trimming assembly as in claim 9 further comprising a shield member rotatably mounted to said second end of said flexible casing and having a generally disc-shaped configuration substantially surrounding said trimmer head, said shield member defining an opening through which said cutting member of said trimmer head may extend into a respective cutting plane, whereby said shield member is rotatable about said flexible casing such that said opening is selectively oriented relative to said respective cutting plane.

15. The edging and trimming assembly as in claim 14 wherein said opening defines a generally convex configuration such that said arm is urged toward said mower deck when said shield member impacts an obstacle at said opening.

16. The edging and trimming assembly as in claim 9 further comprising:
   a gear train operatively connected to said power driven rod and positioned in said hub adjacent said flexible shaft;
   means for selectively engaging said gear train with said flexible shaft, whereby to impart rotational velocity from said power driven rod to said flexible shaft;
   means coupled to said gear train for selectively increasing or decreasing said rotational velocity of said flexible shaft.

* * * * *